(12) United States Patent
Killian et al.

(10) Patent No.: US 6,350,837 B1
(45) Date of Patent: Feb. 26, 2002

(54) COPOLYMERIZATION OF NORBORNENE AND FUNCTIONAL NORBORNENE MONOMERS

(75) Inventors: Christopher Moore Killian, Gray; Peter Borden Mackenzie, Kingsport; John Anthony Hyatt, Chuckey; Leslie Shane Moody, Johnson City; Gino Georges Lavoie, Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/591,569

(22) Filed: Jun. 9, 2000

(51) Int. Cl.[7] .................. C08F 136/00; C08F 236/00
(52) U.S. Cl. .................. 526/260; 526/82; 526/87; 526/286; 526/332; 526/269; 526/270; 526/273; 526/282; 526/314
(58) Field of Search ............... 526/282, 286, 526/332, 82, 87

(56) References Cited

U.S. PATENT DOCUMENTS 3,277,036 A * 10/1966 Whitworth, Jr. et al. ...... 260/23
3,494,897 A * 2/1970 Reding et al. ............. 260/78.5

FOREIGN PATENT DOCUMENTS

| WO | WO 95/14048 A1 | 5/1995 |
|---|---|---|
| WO | WO 95/14048 * | 5/1995 |
| WO | WO 96/23010 A2 | 8/1996 |
| WO | WO 97/02298 A1 | 1/1997 |
| WO | WO 97/17380 A2 | 5/1997 |
| WO | WO 97/48739 A1 | 12/1997 |
| WO | WO 97/48740 A1 | 12/1997 |
| WO | WO 97/48777 A1 | 12/1997 |
| WO | WO 98/03559 A1 | 1/1998 |
| WO | WO 98/30609 A1 | 7/1998 |
| WO | WO 98/30610 A1 | 7/1998 |
| WO | WO 98/37110 A1 | 8/1998 |
| WO | WO 98/40374 A2 | 9/1998 |
| WO | WO 98/40420 A2 | 9/1998 |
| WO | WO 98/42664 A1 | 10/1998 |
| WO | WO 98/42665 A1 | 10/1998 |
| WO | WO 98/47933 A1 | 10/1998 |
| WO | WO 98/56837 A1 | 12/1998 |
| WO | WO 98/56839 A1 | 12/1998 |

* cited by examiner

*Primary Examiner*—David W. Wu
*Assistant Examiner*—R. Harlan
(74) *Attorney, Agent, or Firm*—Jonathan D. Wood; Bernard J. Graves, Jr.

(57) ABSTRACT

The present invention is directed to copolymers of norbornene and functional group containing norbornene comonomers and processes for the preparation thereof. These polymers may be random, alternating or block copolymers or terpolymers, etc. In general, the present invention describes a polymer composition of the formula:

$$[A]_s\text{— and —}[B]_r$$

wherein A is monomer repeat unit derived from one or more norbornene or substituted norbornene monomers and B is a monomer repeat unit derived from one or more functionalized norbornene compounds.

7 Claims, No Drawings

COPOLYMERIZATION OF NORBORNENE AND FUNCTIONAL NORBORNENE MONOMERS

FIELD OF THE INVENTION

This invention relates to polymer compositions derived from norbornene and functional norbornene comonomers and process to prepare such polymer compositions.

BACKGROUND OF THE INVENTION

Cycloolefin polymers (e.g., norbornene-based polymers) and copolymers have received a great deal of attention in recent years. They have found application in dielectric, optical, and photolithographic applications. In addition, the utility of these materials as engineering thermoplastics has been explored. As such, new cyclic olefin copolymers and catalysts for the efficient preparation of cyclic olefin polymers are constantly being sought.

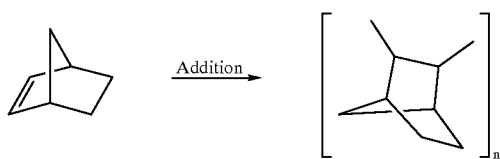

The addition polymer of norbornene (i.e., polynorbornene or poly(bicyclo[2.2.1]hept-2-ene) was originally described in U.S. Pat. No. 2,721,189. In this patent, 2 types of norbornene polymers were prepared. The first polymer was prepared by the addition polymerization of norbornene giving a fully saturated cyclic olefin polymer.

The second polymer was formed by "Ring Opening Metathesis Polymerization" (ROMP) giving an unsaturated polymer backbone.

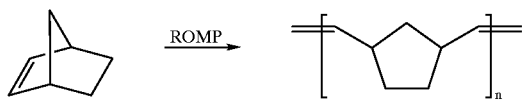

Conventional "Ziegler-Natta" transition metal catalysts, such as those based on titanium compounds (e.g. $TiCl_3$ or $TiCl_4$) in combination with organoaluminum cocatalysts, have been used to prepare the addition polymer of norbornene (see U.S. Pat. No. 3,330,815). These so-called "Ziegler-Natta" catalysts are quite sensitive to oxygen and are generally ineffective for the copolymerization of nonpolar and polar monomers. Following the early discovery of Zielger-Nata catalysts, there has been intense interest in the development and study of homogeneous early transition metal (Group 4–6) catalysts ("metallocene catalysts") for the polymerization of olefins. Addition polymers of norbornene have been prepared using such metallocene catalysts as shown in Kaminsky et. al. *J. Mol. Cat.* 1992, 72, 109; Kaminsky et. al. Makromol. Chem, Macromol. Symp. 1991, 47, 83.

More recently, others have described the use of Group 8–10 catalysts for the polymerization of norbornene and substituted norbornene. See, for example, WO 95 140448; WO 98 56839; WO 98 56837; U.S. Pat. Nos. 5,571,881; 5,468,819; and 5,569,730.

Recent advances in Group 8–10 catalysts for the polymerization of olefins include the following.

European Patent Application No. 381,495 describes the polymerization of olefins using palladium and nickel catalysts, which contain selected bidentate phosphorous containing ligands.

U.S. Pat. Nos. 4,906,754, 4,716,205, 5,030,606, and 5,175,326, describes the conversion of ethylene to polyethylene using anionic phosphorous, oxygen donors ligated to Ni(II). The polymerization reactions were run between 25 and 100° C. with modest yields, producing linear polyethylene having a weight-average molecular weight ranging between 8 K and 350 K. In addition, Klabunde describes the preparation of copolymers of ethylene and functional group containing monomers.

M. Peuckert et al., *Organomet.* 1983, 2(5), 594, disclose the oligomerization of ethylene using phosphine/carboxylate donors ligated to Ni(II), which showed modest catalytic activity (0.14 to 1.83 TO/s). The oligomerizations were carried out at 60 to 95° C. and 10 to 80 bar ethylene in toluene, to produce α-olefins.

U.S. Pat. Nos. 4,689,437 and 4,716,138, describe the oligomerization of ethylene using phosphine, sulfonate donors ligated to Ni(II). These complexes show catalyst activities approximately 15 times greater than those reported with phosphine, carboxylate analogs.

W. Keim et al.,*Angew. Chem. Int. Ed. Eng.,* 1981, 20, 116, and V. M. Mohring et al.,*Angew. Chem. Int. Ed. Eng.,* 1985, 24, 1001, disclose the polymerization of ethylene and the oligomerization of α-olefins with aminobis(imino) phosphorane nickel catalysts.

G. Wilke, i Angew. Chem. Int. Ed. Engl., 1988, 27, 185, describes a nickel allyl phosphine complex for the polymerization of ethylene.

K. A. O. Starzewski et al., *Angew. Chem. Int. Ed. Engl.,* 1987, 26, 63, and U.S. Pat. No. 4,691,036, describe a series of bis(ylide) nickel complexes, used to polymerize ethylene to provide high molecular weight linear polyethylene.

L. K. Johnson et al., WO 96/23010; U.S. Pat. Nos. 5,866,663; 5,886,224; 5,891,963; 5,880,323; and 5,880,241; disclose the polymerization of olefins using cationic nickel, palladium, iron, and cobalt complexes containing diimine and bisoxazoline ligands. These documents also describe the polymerization of ethylene, acyclic olefins, and/or selected cyclic olefins and optionally selected unsaturated acids or esters such as acrylic acid or alkyl acrylates to provide olefin homopolymers or copolymers.

L. K. Johnson et al., *J. Am. Chem. Soc.,* 1995, 117, 6414, describe the polymerization of olefins such as ethylene, propylene, and 1-hexene using cationic α-diimine-based nickel and palladium complexes. These catalysts have been described to polymerize ethylene to high molecular weight branched polyethylene. In addition to ethylene, Pd complexes act as catalysts for the polymerization and copolymerization of olefins and methyl acrylate.

WO 97/02298 discloses the polymerization of olefins using a variety of neutral N, O, P, or S donor ligands, in combination with a nickel(0) compound and an acid.

Further examples of Group 8–10 transition metal catalysts for the polymerization of olefins are illustrated in WO 98/40374, WO 98/37110, WO 98/47933, and WO 98/40420. Also described are several new polymer compositions derived from epoxybutene and derivatives thereof.

Brown et al., WO 97/17380, WO 97/48777, WO 97/48739, and WO 97/48740, describe the use of Pd α-diimine catalysts for the polymerization of olefins including ethylene in the presence of air and water.

Fink et al., U. S. Pat. No. 4,724,273, describe the polymerization of α-olefins using aminobis(imino)phosphorane nickel catalysts and the compositions of the resulting poly (α-olefins).

Recently, Vaughan et al., WO 97/48736, Denton et al., WO 97/48742, and Sugimura et al., WO 97/38024, describe the polymerization of ethylene using silica supported α-diimine nickel catalysts.

EP 884,331, discloses the use of nickel α-diimine catalysts for the polymerization of ethylene in their slurry loop process.

Neutral nickel catalysts for the polymerization of olefins are set forth in WO 98/30610, WO 98/30609, WO 98/42665, and WO 98/42664.

Iron and cobalt catalysts ligated by pyridine bis(imines) for the polymerization and oligomerization of ethylene are described in WO 99/02472, WO 98/27124, and WO 99/12981.

Canich et al., WO 97/48735, and Mecking, DE 19707236 A1, describe the use of mixed α-diimine catalysts with group IV transition metal catalysts for the polymerization of olefins. Additional recent developments are described by Sugimura et al. in JP 96-84344 and JP 96-84343, by Yorisue at al. in JP 96-70332, by McLain et al. in WO 98/03559, by Weinberg et al. in WO 98/03521, by Wang et al. in WO 99/09078, by Coughlin in WO 99/10391, and by Matsunaga et al. in WO 97/48737.

Notwithstanding these advances in catalysis, there remains a need for new transition metal catalysts, particularly those which are more thermally stable, allow for new polymer microstructures, or are more functional group tolerant. In addition, there is a need for novel methods of polymerizing olefins employing such catalysts, and for the novel polymers, which result.

SUMMARY OF THE INVENTION

The present invention is directed to copolymers of norbornene and functional group containing norbornene comonomers and processes for the preparation thereof. These polymers may be random, alternating or block copolymers or terpolymers, etc. In general, the present invention describes a polymer composition comprising repeat units of the formula:

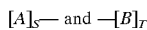

wherein A is monomer repeat unit derived from one or more norbornene or substituted norbornene monomers of the formula:

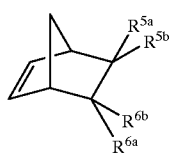

I and B is a monomer repeat unit derived from one or more functional norbornene monomers as set forth herein. The polymers of the invention are useful in the preparation of films, fibers, and molded articles, particularly photoresists applications.

DETAILED DESCRIPTION OF THE INVENTION

The present invention provides a polymer composition comprising repeat units of the formula:

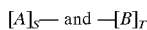

wherein A is monomer repeat unit derived from one or more norbornene or substituted norbornene monomers of the formula:

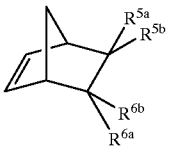

I and B is a monomer repeat unit derived from one or more functional norbornene monomers selected from Set 1;

Set 1

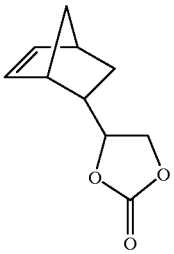

B1

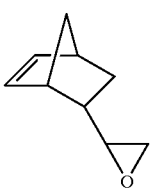

B2

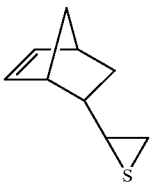

B3

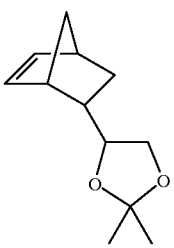

B4

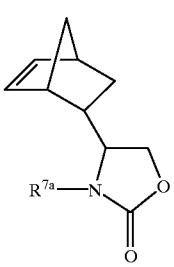

B5

-continued

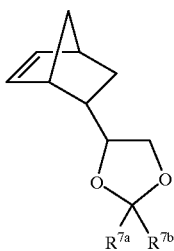

B6

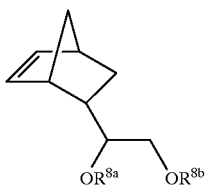

B7 wherein,
$R^{7a-b}$ are independently selected from H, hydrocarbyl, substituted hydrocarbyl, fluoroalkyl;
$R^{8a-b}$ are independently selected from H, hydrocarbyl, substituted hydrocarbyl, fluoroalkyl, or —C(O)—$R^9$ where $R^9$ is hydrocarbyl or substituted hydrocarbyl;
$R^{5a-b}$ and $R^{6a-b}$ are each independently H, hydrocarbyl, halogen, halohydrocarbyl, or
$R^{5a-b}$ and $R^{6a-b}$ may be taken together to form a ring, and
S and T represent the mole fraction of the respective monomer unit and sum to one with the proviso that T>0.

These polymers can be prepared by the transition metal catalyzed polymerization of norbornene and functional norbornene comonomers. Therefore, the polymers of the invention described herein are derived from the addition copolymerization of A and B type monomers. As an example, the polymerization of norbornene and B2 would give a random compolymer having the following monomer repeat units.

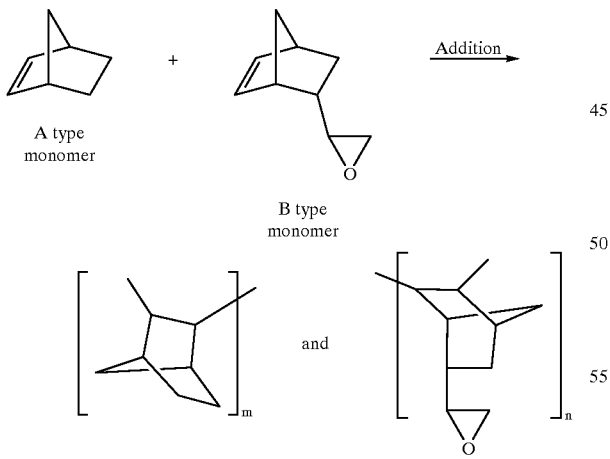

Therefore, the phrase "a monomer repeat unit derived from one or more norbornene, substituted norbornene or functional norbornene monomers" refers to the product of the transition metal catalyzed addition polymerization of said monomers as depicted in the above example. Although it is understood that this example only depicts one combination of A and B type monomers, many other combinations are possible.

In a preferred embodiment, the polymer composition is terminated with an olefinic moiety from a chain transfer agent wherein said agent is a compound having a terminal olefinic double bond between adjacent carbon atoms, provided that said agent is other than a compound selected from the classes of styrenes, vinyl ethers and conjugated dienes, and wherein at least one of said adjacent carbon atoms has two hydrogen atoms attached thereto, and wherein the moiety derived from said chain transfer agent is exclusively located at the terminal end of said polymer. Said chain transfer agent is used to control the molecular weight of these cyclic olefin copolymers. It is often the case that due to the high relative propagation rates to chain transfer rates that in the absence of a chain transfer agent very high molecular weights for these cyclic olefin polymers are obtained. Introduction of a chain transfer agent allows for the predictable control of molecular weight. In a further preferred embodiment, the chain transfer agent is a compound of the following formula:

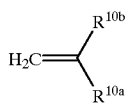

wherein $R^{10a-b}$ are independently selected from a hydrogen atom, hydrocarbyl, and substituted hydrocarbyl. In addition, $H_2$ can be used as a chain transfer agent. As noted above, these are useful in dielectric, optical, and photolithographic applications. In addition, the utility of these materials as engineering thermoplastics has been explored.

In another embodiment of this invention, certain nickel catalysts have been shown to be effective catalysts for the preparation of norbornene functional norbornene copolymers. Thus, as a further aspect of the invention, there is provided a process for preparing a polymer composition comprising repeat units of the formula:

$$[A]_S\text{— and —}[B]_T$$

which comprises contacting norbornene or a substituted norbornene of formula I

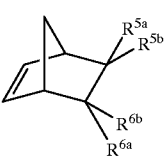

I with one or more functional norbornenes monomers selected from

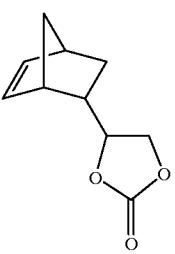

B1

-continued

B2 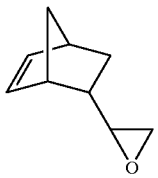

B3 

B4 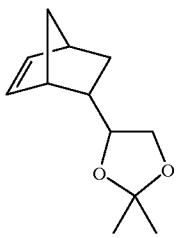

B5 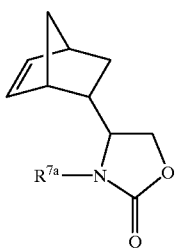

B6 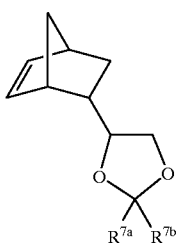

B7 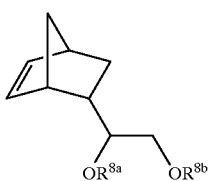

wherein, $R^{7a-b}$ is independently selected from H, hydrocarbyl, subsituted hydrocarbyl, fluoroalkyl;

$R^{8a-b}$ is independently selected from H, hydrocarbyl, substituted hydrocarbyl, fluoroalkyl, C(O)—$R^9$ where $R^9$ is hydrocarbyl or substituted hydrocarbyl;

$R^{5a-b}$ and $R^{6a-z}$ are each independently selected from H, hydrocarbyl, halogen, halohydrocarbyl, $R^{5a-b}$ and $R^{6a-b}$ may be taken together to form a ring, and S and T represent the mole fraction of the respective monomer unit and sum to one with the proviso that T>0, in the presence of a transition metal complex of formula II:

II wherein:

M is nickel;

$D^1$, $D^2$, and G collectively comprise therefor a monoanionic bidentate ligand;

$D^1$ and $D^2$ are monodentate donors linked by a bridging group G, wherein at least one of $D^1$ and $D^2$ is ligated to the metal M by a nitrogen atom substituted by a 1-pyrrolyl or a substituted 1-pyrrolyl group;

T is H, hydrocarbyl, substituted hydrocarbyl, or other group capable of inserting an olefin; and L is an olefin or a neutral donor group capable of being displaced by an olefin; in addition, T and L may be taken together to form a π-allyl or π-benzyl group or other bidentate group.

Examples of preferred monoanionic bidentate donors are shown in Set 2:

Set 2

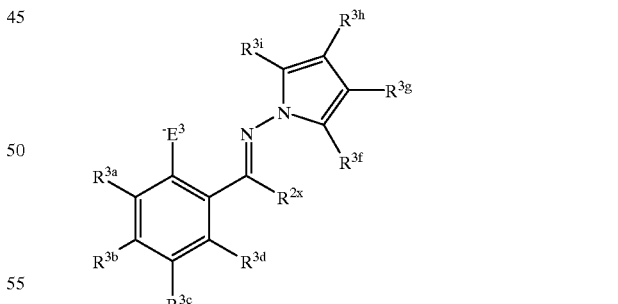
c1

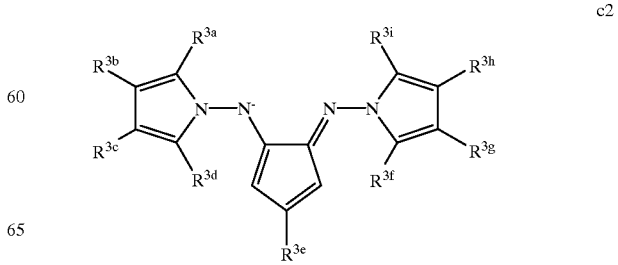
c2

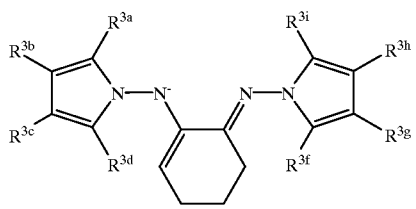
c3
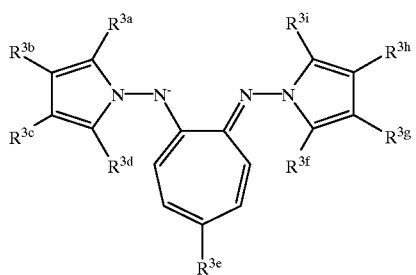
c4
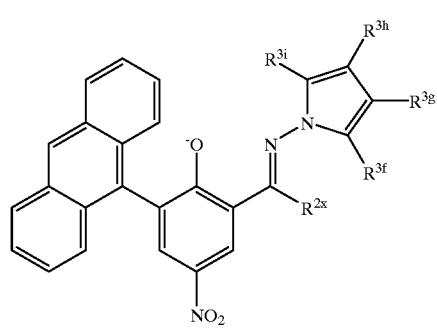
c5
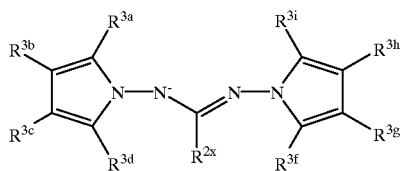
c6
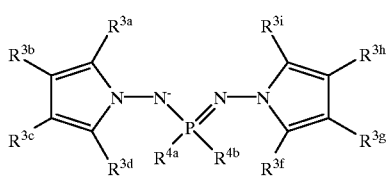
c7
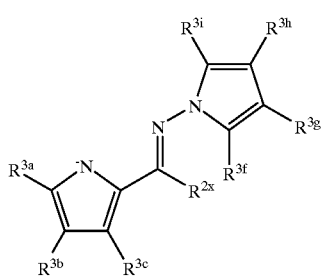
c8
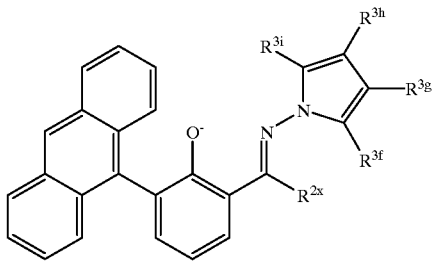
c9
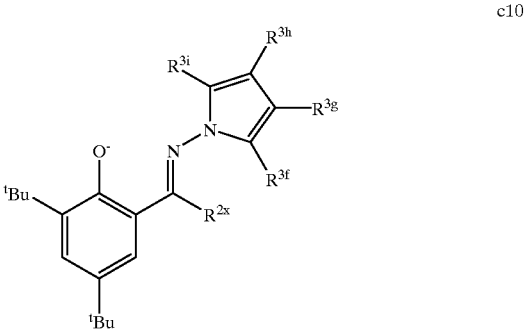
c10
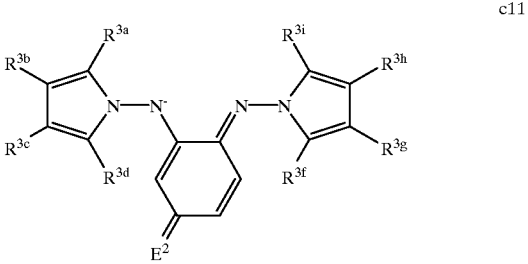
c11
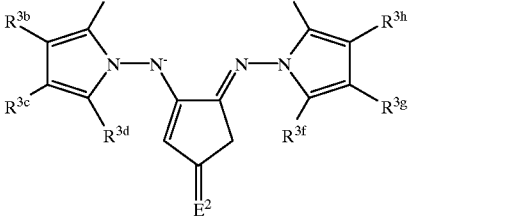
c12
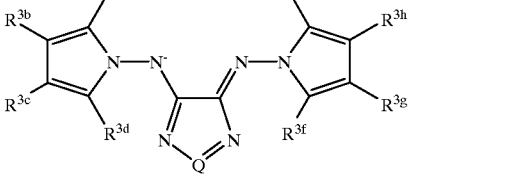
c13
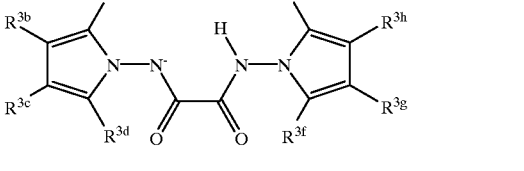
c14 wherein:

R$^{2a-z}$ are each independently H, hydrocarbyl, substituted hydrocarbyl, heteroatom connected hydrocarbyl, or heteroatom connected substituted hydrocarbyl; R$^{2a-w}$ may also be silyl, boryl, or ferrocenyl; in addition, any two of R$^{2a-w}$ or R$^{2x}$ and R$^{2y}$, may be linked by a bridging group;

R$^{3a-z}$ are each independently H, hydrocarbyl, substituted hydrocarbyl, heteroatom connected hydrocarbyl, heteroatom connected substituted hydrocarbyl, fluoroalkyl, silyl, boryl, fluoro, chloro, bromo, cyano, or nitro; in addition, any two of R$^{3a-z}$ may be linked by a bridging group;

R$^{4a}$ and R$^{4b}$ are each independently hydrocarbyl, substituted hydrocarbyl, heteroatom connected hydrocarbyl, or heteroatom connected substituted hydrocarbyl; in addition, R$^{4a}$ and R$^{4b}$ may be linked by a bridging group;

E$^2$ and E$^3$ are O, S, or NR$^{2a}$; and

Q is C-R$^{3a}$, PR$^{4a}$R$^{4b}$, S(E$^2$)(NR$^{2a}$R$^{2b}$), or S(E$^2$)(E$^3$R$^{2a}$).

The present invention further comprises, a process for preparing a polymer composition comprising repeat units of the formula:

$$[A]_S\text{—— and ——}[B]_T$$

which comprises contacting norbornene or a subsituted norbornene of formula I

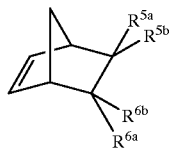

I with one or more functional norbornene monomers selected from

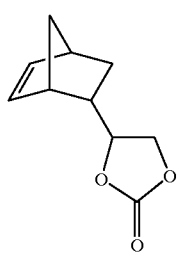

B1

B2

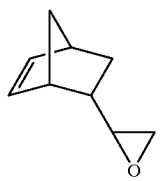

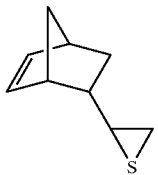

B3

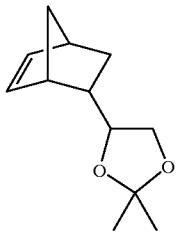

B4

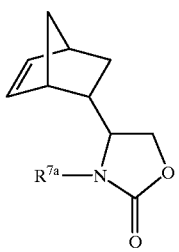

B5

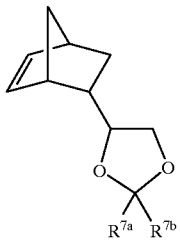

B6

B7 wherein,

R$^{7a-b}$ is independently selected from H, hydrocarbyl, subsituted hydrocarbyl, fluoroalkyl;

R$^{8a-b}$ is independently selected from H, hydrocarbyl, substituted hydrocarbyl, fluoroalkyl, C(O)—R$^9$ where R$^9$ is hydrocarbyl or substituted hydrocarbyl;

R$^{5a-b}$ and R$^{a-z}$ are each independently selected from H, hydrocarbyl, halogen, halohydrocarbyl, R$^{5a-b}$ and R$^{6a-b}$ may be taken together to form a ring, and S and T represent the mole fraction of the respective monomer unit and sum to one with the proviso that T>0, with the reaction product of Ni(COD)$_2$ and tris (pentafluorophenyl)borane.

The present invention further comprises a process for preparing a polymer composition comprising repeat units of the formula:

$$[A]_S\text{—— and ——}[B]_T$$

which comprises contacting norbornene or a subsituted norbornene of formula I

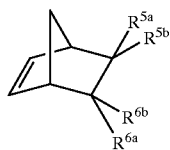

I with one or more functional norbornene monomers selected from

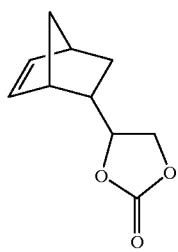

B1

B2

B3

B4

B5

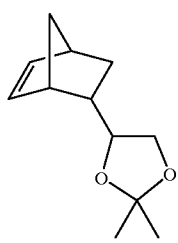

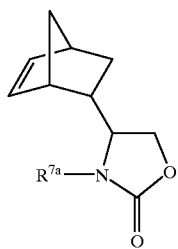

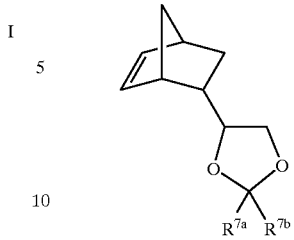

B6

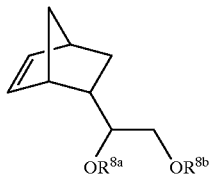

B7 wherein, $R^{7a\text{-}b}$ is independently selected from H, hydrocarbyl, substituted hydrocarbyl, fluoroalkyl;

$R^{8a\text{-}b}$ is independently selected from H, hydrocarbyl, substituted hydrocarbyl, fluoroalkyl, C(O)—$R^9$ where $R^9$ is hydrocarbyl or substituted hydrocarbyl;

$R^{5a\text{-}b}$ and $R^{6a\text{-}z}$ are each independently selected from H, hydrocarbyl, halogen, halohydrocarbyl, $R^{5a\text{-}b}$ and $R^{6a\text{-}b}$ may be taken together to form a ring, and S and T represent the mole fraction of the respective monomer unit and sum to one with the proviso that T>0, with the reaction product of a ligand from Set 3, Ni(COD)$_2$ and tris(pentafluorophenyl)borane.

Set 3

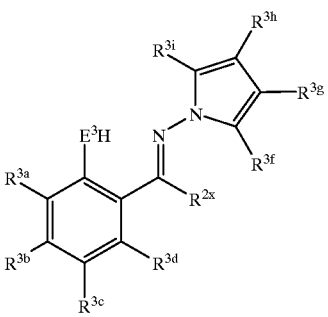

d1

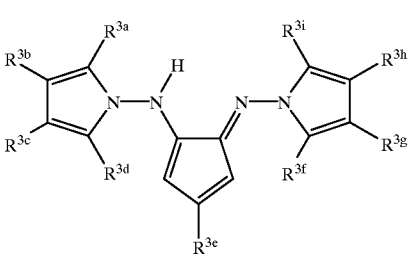

d2

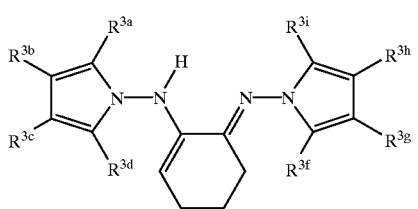
d3
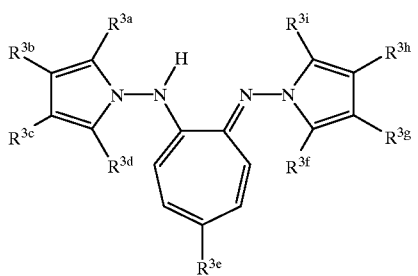
d4
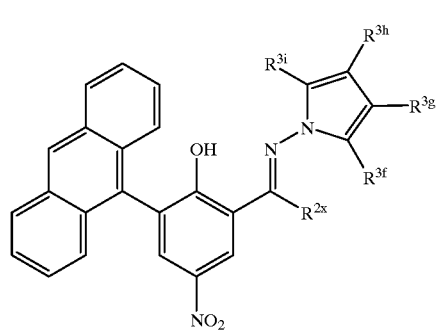
d5
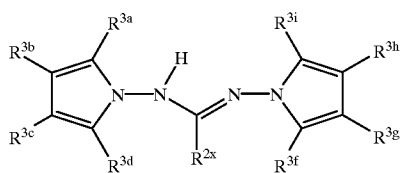
d6
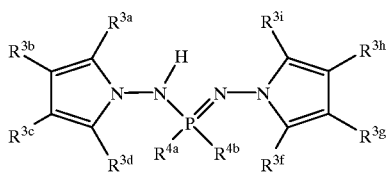
d7
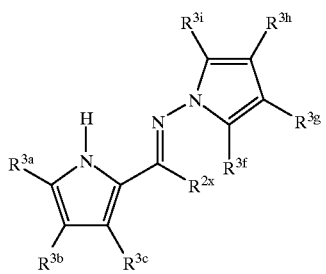
d8
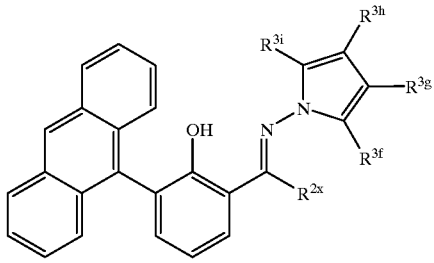
d9
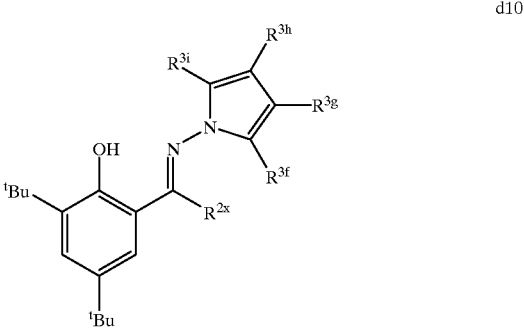
d10
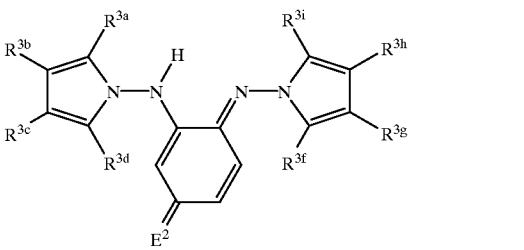
d11
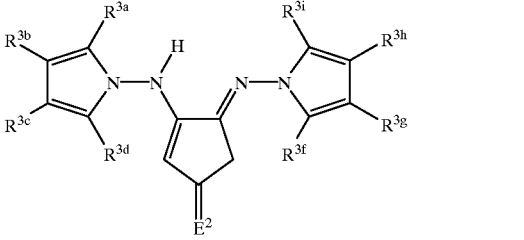
d12
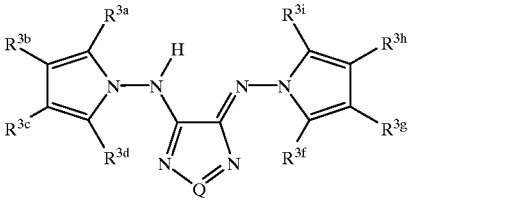
d13
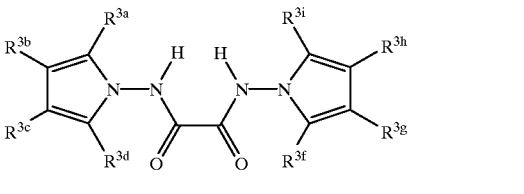
d14

In this disclosure, symbols ordinarily used to denote elements in the Periodic Table take their ordinary meaning, unless otherwise specified. Thus, N, O, S, P, and Si stand for nitrogen, oxygen, sulfur, phosphorus, and silicon, respectively.

A "—$NR^{2a}R^{2b}$" group refers to a group of formula Ia below:

Ia wherein $R^{2a}$ and $R^{2b}$ are each independently H, hydrocarbyl, substituted hydrocarbyl, heteroatom connected hydrocarbyl, heteroatom connected substituted hydrocarbyl, silyl, boryl, or ferrocenyl; in addition, $R^{2a}$ and $R^{2b}$ may be connected to form a ring.

A "1-pyrrolyl or substituted 1-pyrrolyl" group refers to a group of formula III below:

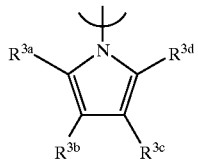

III wherein $R^{3a-d}$ are each independently H, hydrocarbyl, substituted hydrocarbyl, heteroatom connected hydrocarbyl, heteroatom connected substituted hydrocarbyl, fluoroalkyl, silyl, boryl, fluoro, chloro, bromo, cyano, or nitro; in addition, any two or more of $R^{3a-d}$ may be linked by a bridging group or groups.

A "hydrocarbyl" group means a monovalent or divalent, linear, branched or cyclic group which contains only carbon and hydrogen atoms. Examples of monovalent hydrocarbyls include the following: $C_1$–$C_{20}$ alkyl; $C_1$–$C_{20}$ alkyl substituted with one or more groups selected from $C_1$–$C_{20}$ alkyl, $C_3$–$C_8$ cycloalkyl, and aryl; $C_3$–$C_8$ cycloalkyl; $C_3$–$C_8$ cycloalkyl substituted with one or more groups selected from $C_1$–$C_{20}$ alkyl, $C_3$–$C_8$ cycloalkyl, and aryl; $C_6$–$C_{14}$ aryl; and $C_6$–$C_{14}$ aryl substituted with one or more groups selected from $C_1$–$C_{20}$ alkyl, $C_3$–$C_8$ cycloalkyl, and aryl; where the term "aryl" preferably denotes a phenyl, napthyl, or anthracenyl group. Examples of divalent (bridging) hydrocarbyls include: —$CH_2$—, —$CH_2CH_2$—, —$CH_2CH_2CH_2$—, and 1,2-phenylene.

A "silyl" group refers to a $SiR_3$ group wherein Si is silicon and R is hydrocarbyl or substituted hydrocarbyl or silyl, as in $Si(SiR_3)_3$.

A "boryl" group refers to a $BR_2$ or $B(OR)_2$ group, wherein R is hydrocarbyl or substituted hydrocarbyl.

A "heteroatom" refers to an atom other than carbon or hydrogen. Preferred heteroatoms include oxygen, nitrogen, phosphorus, sulfur, selenium, arsenic, chlorine, bromine, silicon, and fluorine.

A "substituted hydrocarbyl" refers to a monovalent, divalent, or trivalent hydrocarbyl substituted with one or more heteroatoms. Examples of monovalent substituted hydrocarbyls include: 2,6-dimethyl-4-methoxyphenyl, 2,6-diisopropyl-4-methoxyphenyl, 4-cyano-2,6-dimethylphenyl, 2,6-dimethyl-4-nitrophenyl, 2,6-difluorophenyl, 2,6-dibromophenyl, 2,6-dichlorophenyl, 4-methoxycarbonyl-2,6-dimethylphenyl, 2-tert-butyl-6-chlorophenyl, 2,6-dimethyl-4-phenylsulfonylphenyl, 2,6-dimethyl-4-trifluoromethylphenyl, 2,6-dimethyl-4-trimethylammoniumphenyl (associated with a weakly coordinated anion), 2,6-dimethyl-4-hydroxyphenyl, 9-hydroxyanthr-10-yl, 2-chloronapth-1-yl, 4-methoxyphenyl, 4-nitrophenyl, 9-nitroanthr-10-yl, —$CH_2OCH_3$, cyano, trifluoromethyl, and fluoroalkyl. Examples of divalent (bridging) substituted hydrocarbyls include: 4-methoxy-1,2-phenylene, 1-methoxymethyl-1,2-ethanediyl, 1,2-bis(benzyloxymethyl)-1,2-ethanediyl, and 1-(4-methoxyphenyl)-1,2-ethanediyl.

A "heteroatom connected hydrocarbyl" refers to a group of the type $E^{10}$(hydrocarbyl), $E^{20}$H(hydrocarbyl), or $E^{20}$(hydrocarbyl)$_2$, where $E^{10}$ is an atom selected from Group 16 and $E^{20}$ is an atom selected from Group 15.

A "heteroatom connected substituted hydrocarbyl" refers to a group of the type $E^{10}$(substituted hydrocarbyl), $E^{20}$H (substituted hydrocarbyl), or $E^{20}$(substituted hydrocarbyl)$_2$, where $E^{10}$ is an atom selected from Group 16 and $E^{20}$ is an atom selected from Group 15.

The term "fluoroalkyl" as used herein refers to a $C_1$–$C_{20}$ alkyl group substituted by one or more fluorine atoms.

In some cases, the Group 8–10 catalysts can be inhibited by olefins that contain additional olefinic or acetylenic functionality. This is especially likely if the catalyst is prone to "chain-running" wherein the catalyst can migrate up and down the polymer chain between insertions, since this can lead to the formation of relatively unreactive π-allylic intermediates when the olefin monomer contains additional unsaturation.

The term "α-olefin" as used herein is a 1-alkene with from 3 to 40 carbon atoms.

A "α-allyl" group refers to a monoanionic group with three $sp^2$ carbon atoms bound to a metal center in a $\eta^3$-fashion. Any of the three $sp^2$ carbon atoms may be substituted with a hydrocarbyl, substituted hydrocarbyl, heteroatom connected hydrocarbyl, heteroatom connected substituted hydrocarbyl, or O-silyl group. Examples of π-allyl groups include:

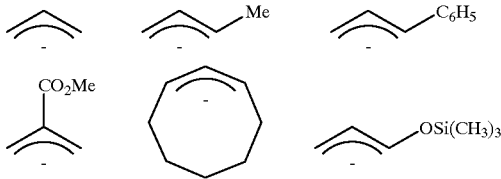

The term π-benzyl group denotes an π-allyl group where two of the $sp^2$ carbon atoms are part of an aromatic ring. Examples of π-benzyl groups include:

"Bridging group" refers to an atom or group which links two or more groups, which has an appropriate valency to satisfy its requirements as a bridging group, and which is compatible with the desired catalysis. Suitable examples include divalent or trivalent hydrocarbyl, substituted hydrocarbyl, heteroatom connected hydrocarbyl, heteroatom connected substituted hydrocarbyl, substituted silicon (IV), boron(III), N(III), P(III), and P(V), —C(O)—, —$SO_2$—, —C(S)—, —B(OMe)—, —C(O)C(O)—, O, S, and Se. In some cases, the groups which are said to be "linked by a bridging group" are directly bonded to one another, in which case the term "bridging group" is meant to refer to that bond. By "compatible with the desired catalysis," we mean the bridging group either does not interfere with the desired catalysis, or acts to usefully modify the catalyst activity or selectivity.

The catalysts of the present invention may be used in batch and continuous processes, in solution or slurry or gas phase processes.

In some cases it is advantageous to attach the catalyst to a solid support. Examples of useful solid supports include: inorganic oxides, such as talcs, silicas, titania, silica/chromia, silica/chromia/titania, silica/alumina, zirconia, aluminum phosphate gels, silanized silica, silica hydrogels, silica xerogels, silica aerogels, montmorillonite clay and silica co-gels, as well as organic support materials such as polystyrene and functionalized polystyrene. (See, for example, S. B. Roscoe et al., "Polyolefin Spheres from Metallocenes Supported on Non-Interacting Polystyrene," 1998, *Science*, 280, 270–273 (1998)).

The monomeric species of Set 1 above can be easily prepared by the Diels-Alder cycloaddition of a diene with a dienophile. This reaction is represented by the following general reaction scheme, in which the diene D is reacted at elevated temperature with the dienophile E giving the monomer of the general formula I:

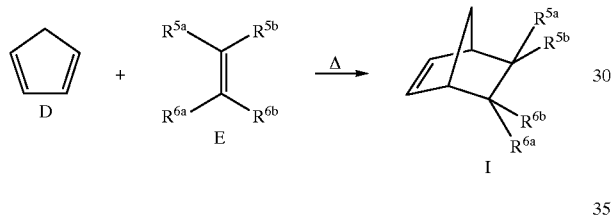

A specific example of such a reaction is the reaction of cyclopentadiene with 3,4-epoxybutene (reacted for 66 hours at 170° C.):

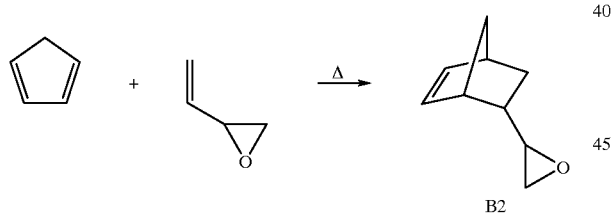

The ligands of the present invention may be prepared by methods known to those skilled in the art, wherein a substituted 1-aminopyrrole is condensed with a monoaldehyde, mono-ketone, di-aldehyde or di-ketone to afford the desired ligands (Scheme II). The requisite substituted 1-aminopyrroles may be prepared by any of a variety of methods, including those shown in Scheme III.

Scheme II

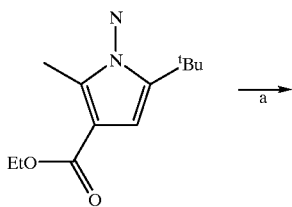

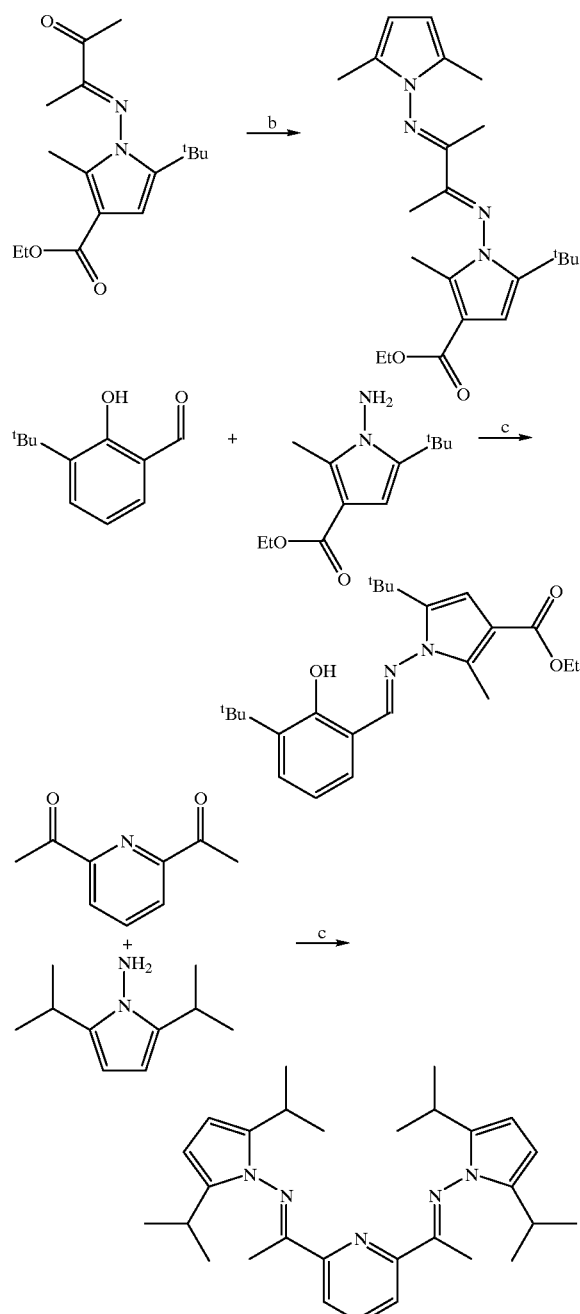

[a] Reaction conditions. (a) CH$_3$COCOCH$_3$ (2.0 equiv), p-Toluenesulfonic Acid (p-TsOH) (3 wt%), 60° C.; (b) 1-amino-2,5-dimethylpyrrole (1.1 equiv), toluene, p-TsOH (3 wt%), Dean Stark Trap, 110° C.; (c) Toluene, p-TsOH (3 wt%), Dean Stark Trap, 110° C.

Scheme III

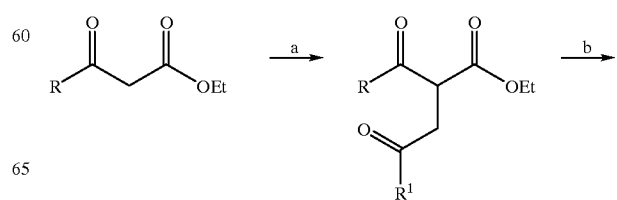

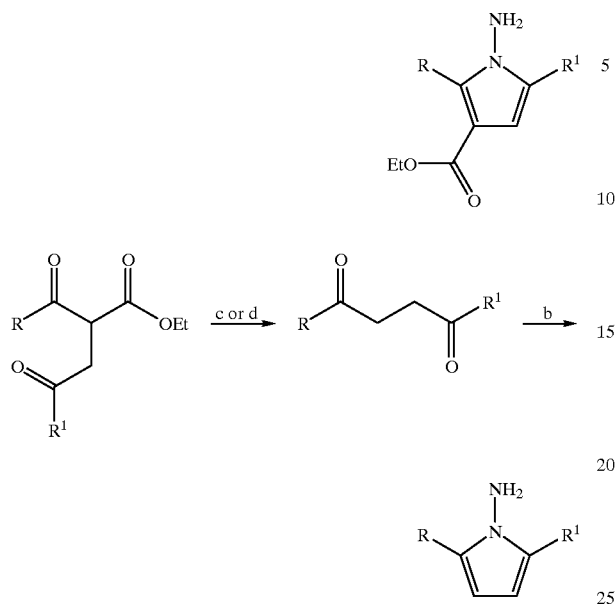

[a] Reaction conditions. (a) NaH (1,2 equiv), R¹COCH₂Br, Toluene, 75° C.; (b) i. hydrazinecarboxylic acid 2-trimethylsilanyl-ethyl ester (TMSECNHNH₂), p-TsOH (3 wt%), Toluene, Dean Stark Trap, 110° C., ii. TBAF (2 equiv), THF, 23° C.; (c) NaOH (5 equiv), i-PrOH, H₂O, 60° C.; (d) NaCl, DMSO, H₂O, 160° C.

Other features of the invention will become apparent in the following description of working examples, which have been provided for illustration of the invention and are not intended to be limiting thereof.

EXAMPLES

Example 1

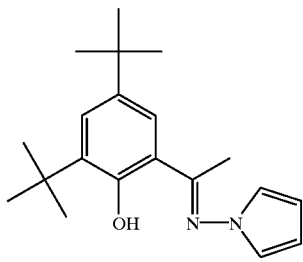

IV

Synthesis of IV

The 1-aminopyrroyl (0.99 g, purchased TCI) and 2.54 g of 3,5-di-tert-butylsalicylaldehyde (Aldrich) where dissolved in warm methanol (35-ml) and 4 drops of formic acid was added to the mixture. The solution was purged with nitrogen and heated to ~50° C. for 30 minutes. The mixture was removed from the heat bath and allowed to cool resulting in the crystallization of the desired product. The product was isolated by filtration and washed 3 times with a portion of cold methanol. ¹H NMR (300 MHz in chloroform-d): δ11.58 (s,1H), δ7.78 (1H), δ7.6 (1H), δ6.8 (1H), δ6.6 (2H), δ6.2 (2H), δ1.6 (9H), δ1.35 (9H).

Example 2

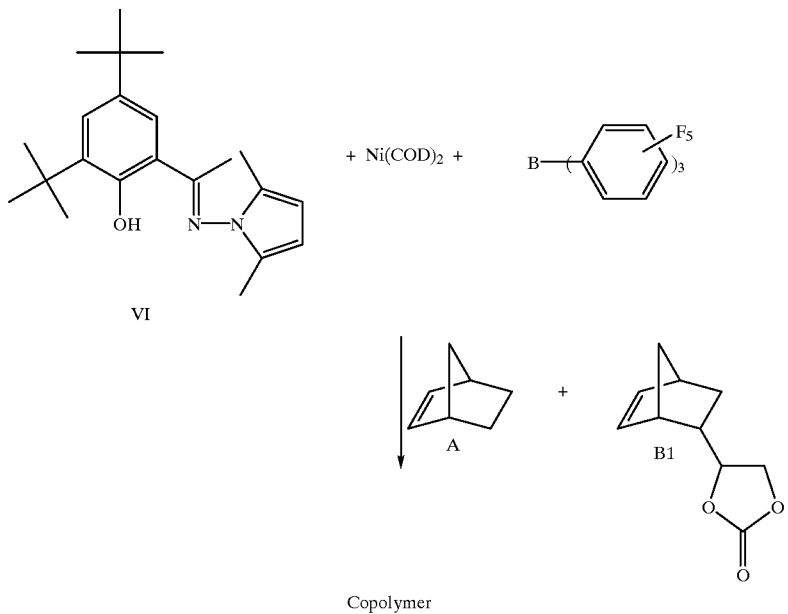

Copolymerization

The ligand VI (12 mg, 0.036 mmol), Ni(COD)$_2$ (10 mg, 0.036 mmol) and tris(pentafluorophenyl)borane (18.4 mg, 0.036 mmol) were weighed and added in an inert atmospheres glove box to a flame dried Schlenk flask. The flask was removed from the glove box and placed under an argon atmosphere. Toluene (45-ml) was then added to the flask. After 5 minutes, a 5-ml toluene solution of 1.5 g of A and 1.5 g of B1 was added to the catalyst mixture. After 1 hour, the reaction was quenched upon addition of methanol and acetone. The polymer was collected by suction filtration and dried in a vacuum oven at ~80° C. overnight giving 0.935 g of copolymer. $^1$H NMR (500 MHz in o-dichlorobenzene): consistent with copolymer having 15 mol % of B1 monomer incorporated with the carbonate intact. IR (CO stretch) 1815 cm$^{-1}$; GPC M$_n$=34,000, PDI=3.67.

Example 3

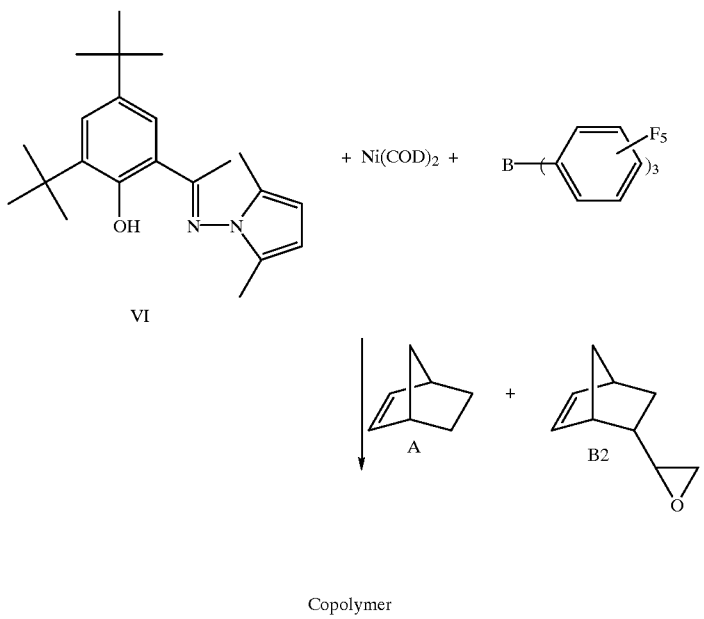

Copolymer

Copolymerization

The ligand VI (12 mg, 0.036 mmol), Ni(COD)$_2$ (10 mg, 0.036 mmol) and tris(pentafluorophenyl)borane (18.4 mg, 0.036 mmol) were weighed and added in an inert atmospheres glove box to a flame dried Schlenk flask. The flask was removed from the glove box and placed under an argon atmosphere. Toluene (10-ml) was then added to the flask. After 5 minutes, a 5-ml toluene solution of 0.5 g of A and 0.5 g of B2 was added to the catalyst mixture. After 17 hours the reaction was quenched upon addition of methanol and acetone. The polymer was collected by suction filtration and dried in a vacuum oven at ~80° C. overnight giving 0.26 g of copolymer. $^1$H NMR (500 MHz in o-dichlorobenzene): consistent with the desired copolymer; GPC M$_n$=68,000, PDI=17.13.

Example 4

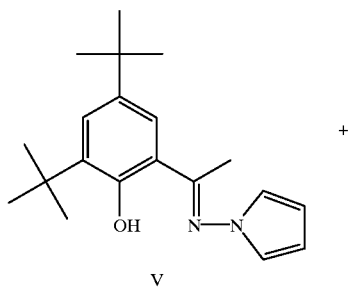

V

-continued

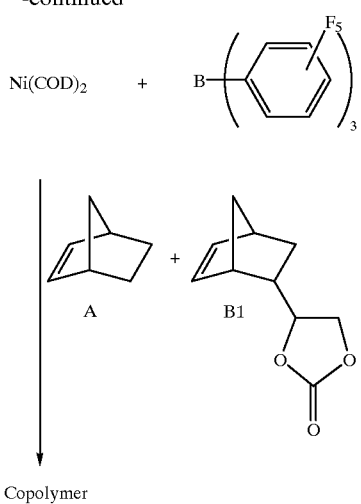

Copolymer

Copolymerization

The ligand V (18.4 mg, 0.062 mmol), Ni(COD)$_2$ (17 mg, 0.062 mmol) and tris(pentafluorophenyl)borane (31.6 mg, 0.062 mmol) were weighed and added in an inert atmospheres glove box to a flame dried Schlenk flask. The flask was removed from the glove box and placed under an argon atmosphere. Toluene (20-ml) was then added to the flask. After 5 minutes, a 5-ml toluene solution of 1.5 g of A and 1.5-ml of B1 was added to the catalyst mixture. After 2 hours, the reaction was quenched upon addition of methanol and acetone. The polymer was collected by suction filtration and dried in a vacuum oven at ~80° C. overnight giving 1.1 g of copolymer. $^1$H NMR (500 MHz in o-dichlorobenzene): consistent with the desired copolymer; GPC M$_n$=44,000, PDI=10.81.

Example 5

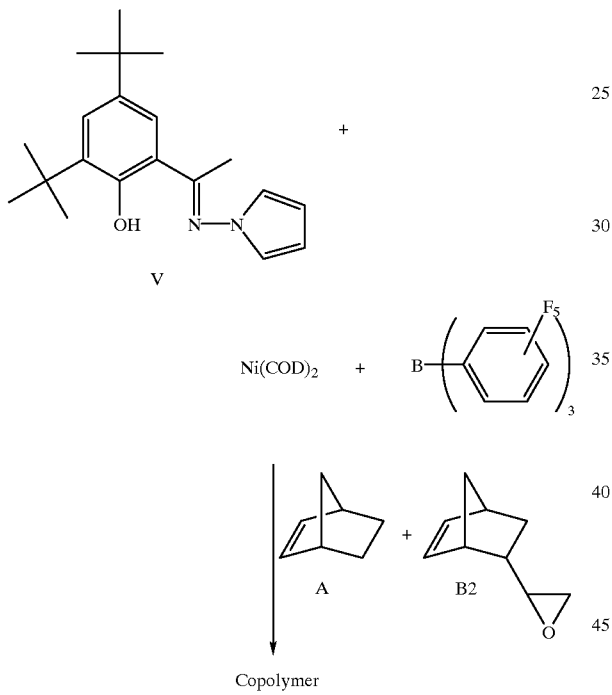

Copolymerization

The ligand V (10.8 mg, 0.036 mmol), Ni(COD)$_2$ (10 mg, 0.036 mmol) and tris(pentafluorophenyl)borane (18.4 mg, 0.036 mmol) were weighed and added in an inert atmospheres glove box to a flame dried Schlenk flask. The flask was removed from the glove box and placed under an argon atmosphere. Toluene (20-ml) was then added to the flask. After 5 minutes, a 5-ml toluene solution of 1.5 g of A and 1.5-ml of B2 was added to the catalyst mixture. After 1.5 hours the reaction was quenched upon addition of methanol and acetone. The polymer was collected by suction filtration and dried in a vacuum oven at ~80° C. overnight giving 1.2 g of copolymer. $^1$H NMR (500 MHz in o-dichlorobenzene): consistent with the desired copolymer; GPC M$_n$=7,700, PDI=76.07.

Example 6

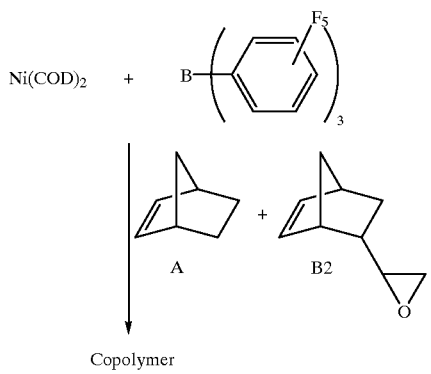

Copolymerization

Ni(COD)$_2$ (10 mg, 0.036 mmol) and tris(pentafluorophenyl)borane (18.4 mg, 0.036 mmol) were weighed and added in an inert atmospheres glove box to a flame dried Schlenk flask. The flask was removed from the glove box and placed under an argon atmosphere. Toluene (20-ml) was then added to the flask. After 5 minutes, a 5-ml toluene solution of 1.5 g of A and 1.5 g of B2 was added to the catalyst mixture. After 45 minutes, the reaction was quenched upon addition of methanol and acetone. The polymer was collected by suction filtration and dried in a vacuum oven at ~80° C. overnight giving 1.2 g of copolymer. $^1$H NMR (500 MHz in o-dichlorobenzene): consistent with the desired copolymer; GPC M$_n$=329,000, PDI=1.83.

Example 7

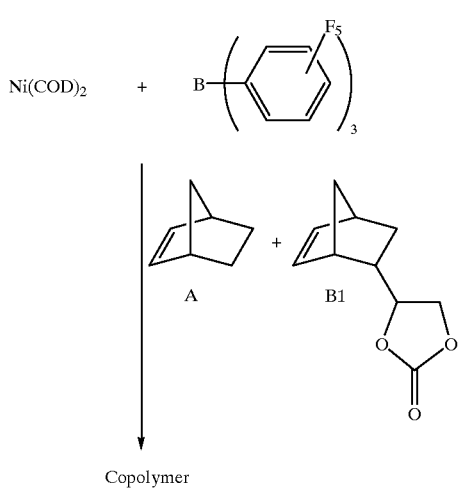

Copolymerization

Ni(COD)$_2$ (10 mg, 0.036 mmol) and tris(pentafluorophenyl)borane (18.4 mg, 0.036 mmol) were weighed and added in an inert atmospheres glove box to a flame dried Schlenk flask. The flask was removed from the glove box and placed under an argon atmosphere. Toluene (20-ml) was then added to the flask. After 5 minutes, a 5-ml toluene solution of 1.5 g of A and 1.6 g of B1 was added to the catalyst mixture. After 45 minutes, the reaction was quenched upon addition of methanol and acetone. The polymer was collected by suction filtration and dried in a vacuum oven at ~80° C. overnight giving 0.25 g of copolymer.

Example 8

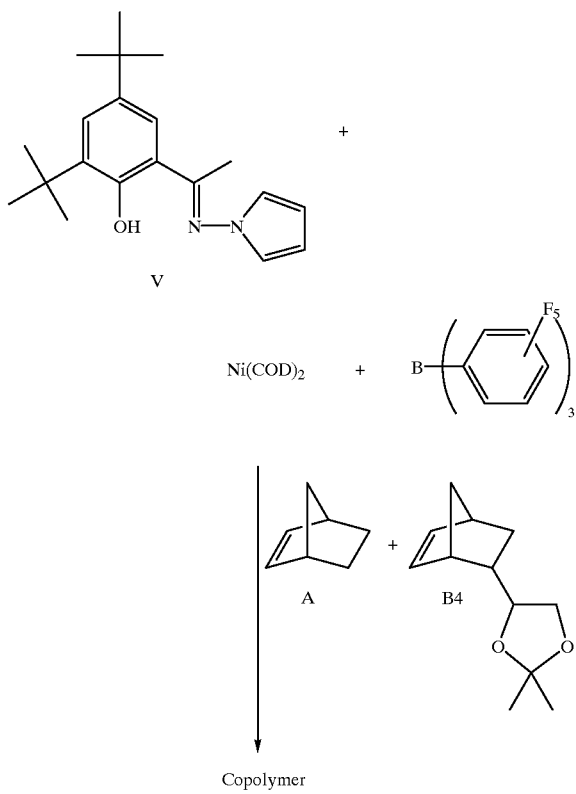

Copolymerization

The ligand V (3.3 mg, 0.011 mmol), Ni(COD)$_2$ (3 mg, 0.011 mmol) and tris(pentafluorophenyl)borane (5.6 mg, 0.011 mmol) were weighed and added in an inert atmospheres glove box to a flame dried Schlenk flask. The flask was removed from the glove box and placed under an argon atmosphere. Toluene (4-ml) was then added to the flask. After 5 minutes, a 4-ml toluene solution of 0.5 g of A and 0.5-ml of B4 was added to the catalyst mixture. After 1 hour, the reaction was quenched upon addition of methanol and acetone. The polymer was collected by suction filtration and dried in a vacuum oven at ~80° C. overnight giving 0.02 g of copolymer. $^1$H NMR (500 MHz in o-dichlorobenzene): consistent with the desired copolymer; GPC M$_n$=170,000, PDI=1.38.

Example 9

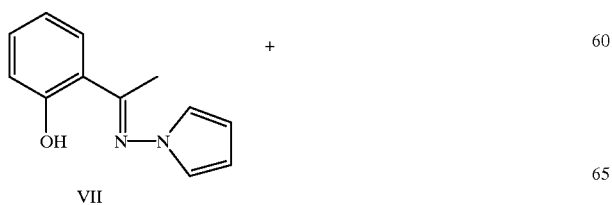

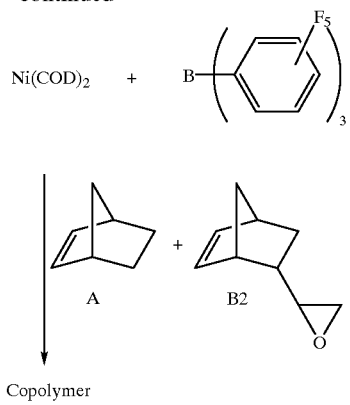

Copolymerization

The ligand VII (6.7 mg, 0.036 mmol), Ni(COD)$_2$ (10 mg, 0.036 mmol) and tris(pentafluorophenyl)borane (18.4 mg, 0.036 mmol) were weighed and added in an inert atmospheres glove box to a flame dried Schlenk flask. The flask was removed from the glove box and placed under an argon atmosphere. Toluene (20-ml) was then added to the flask. After 5 minutes, a 5-ml toluene solution of 1.5 g of A and 1.5-ml of B2 was added to the catalyst mixture. After 1 hour, the reaction was quenched upon addition of methanol and acetone. The polymer was collected by suction filtration and dried in a vacuum oven at ~80° C. overnight giving 0.57 g of copolymer. $^1$H NMR (500 MHz in o-dichlorobenzene): consistent with the desired copolymer; GPC M$_n$=263,800, PDI =1.78.

We claim:

1. A polymer composition comprising repeat units of the formula:

$[A]_s$— and —$[B]_r$ wherein A is monomer repeat unit derived from at least one norbornene or substituted norbornene monomers of the formula,

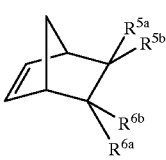

and B is a monomer repeat unit derived from at least one norbornene monomer selected from

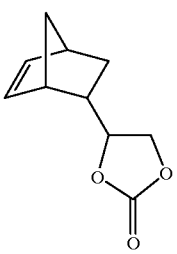

B1

B3

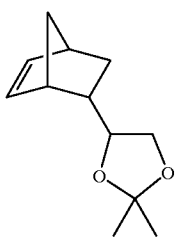
B4

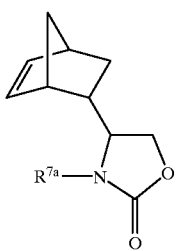
B5

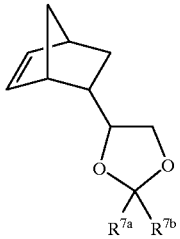
B6

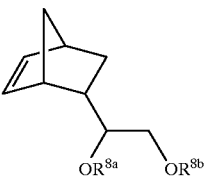
B2

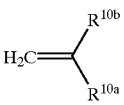
B7 wherein, $R^{7a-b}$ is independently selected from H, hydrocarbyl, subsituted hydrocarbyl, fluoroalkyl;

$R^{8a-b}$ is independently selected from H, hydrocarbyl, substituted hydrocarbyl, fluoroalkyl, C(O)—$R^9$ where $R^9$ is hydrocarbyl or substituted hydrocarbyl;

$R^{5a-b}$ and $R^{6a-z}$ are each independently H, hydrocarbyl, halogen, halohydrocarbyl, $R^{5a-b}$ and $R^{6a-b}$ may be taken together to form a ring, and S and T represent the mole fraction of the respective monomer unit and sum to one with the proviso that T>0.

2. The polymer composition of claim 1, wherein A is monomer repeat unit derived from norbornene and B is the monomer unit derived from the compound of formula B1.

3. The polymer composition of claim 1, wherein A is monomer repeat unit derived from norbornene and B is the monomer unit derived from the compound of formula B2.

4. The polymer composition of claim 1, wherein A is monomer repeat unit derived from norbornene and B is the monomer unit derived from the compound of formula B4.

5. The polymer composition of claim 1, wherein the polymer is terminated with an olefinic moiety from a chain transfer agent wherein said agent is a compound having a terminal olefinic double bond between adjacent carbon atoms, provided that said agent is other than a compound selected from the classes of styrenes, vinyl ethers and conjugated dienes, and wherein at least one of said adjacent carbon atoms has two hydrogen atoms attached thereto, and wherein the moiety derived from said chain transfer agent is exclusively located at the terminal end of said polymer.

6. The polymer composition of claim 5, wherein the chain transfer agent is a compound of the following formula:

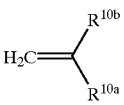

wherein $R^{10a-b}$ are independently selected from a hydrogen atom, hydrocarbyl, and substituted hydrocarbyl.

7. A shaped or formed article comprised of the polymer composition of claim 1.

* * * * *